G. W. RICHARDSON.
ELECTRIC MOTOR.
APPLICATION FILED JAN. 22, 1907.
907,176.
Patented Dec. 22, 1908.
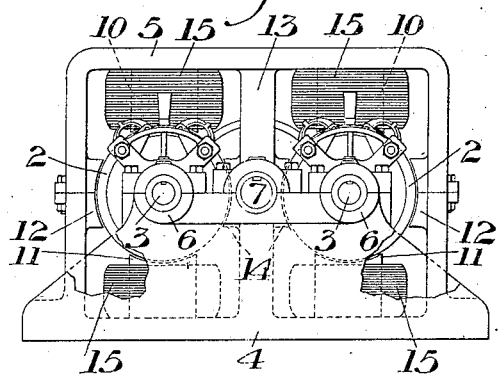
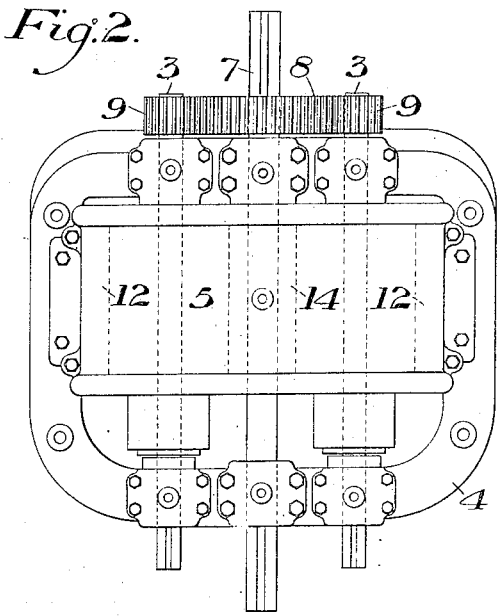
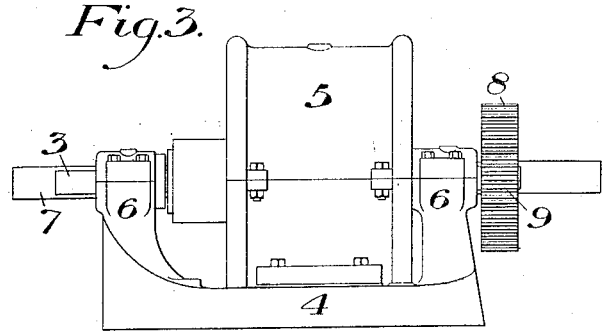
WITNESSES
W. W. Swartz
R. A. Balderson
INVENTOR
Geo. W. Richardson,
by Bakewell & Byrnes,
his attys.

UNITED STATES PATENT OFFICE.

GEORGE W. RICHARDSON, OF WISSAHICKON, PENNSYLVANIA.

ELECTRIC MOTOR.

No. 907,176.  Specification of Letters Patent.  Patented Dec. 22, 1908.

Application filed January 22, 1907. Serial No. 353,416.

*To all whom it may concern:*

Be it known that I, GEORGE W. RICHARDSON, of Wissahickon, in the county of Philadelphia and State of Pennsylvania, have invented a new and useful Improvement in Electric Motors, of which the following is a full, clear, and exact description, reference being had to the accompanying drawings, forming part of this specification, in which—

Figure 1 is an end view of a motor embodying my invention; Fig. 2 is a plan view of the same; Fig. 3 is a side view.

My invention relates to electric motors, and is more especially designed to provide a motor for heavy work, such as the operation of roll tables in iron and steel mills, for use in electric cranes, and for other work where the motor must be started under heavy load.

My invention also consists in the novel construction, arrangement and combination of parts all substantially as hereinafter described and pointed out in the appended claims.

In the drawings, in which I have illustrated one form of motor embodying my invention, the numerals 2 designate the two armatures whose shafts 3 are supported in parallel relation to each other in a single magnetic frame. This frame consists of a base portion 4 and a top portion 5, the base portion 4 being provided with suitable bearings 6 for the armature shafts 2, and also for a central motor shaft 7 which is geared to both the armature shafts by means of the spur gear wheel 8 and pinions 9. The magnetic frame is provided with the upper whole pole-pieces 10, one above each armature, and with the lower whole pole pieces 11, one below each armature; also with the consequent side poles 12. The frame also carries the central leg 13 having a central pole piece 14 common to both armatures. The plane of division between the base and the top portions of the frame is preferably centrally through the poles 12 and 14, whereby each magnetic frame has a half pole piece 12 and a half pole piece 14. The upper and lower poles 10 and 11 are provided with the field coils 15.

The armature coils, together with the field coils 15, are provided with the necessary electric connections for operating the motor in straight series, with the armatures in series and fields in parallel, and in straight parallel.

The advantages of my invention result from the provision of the two armatures in a single magnetic multi-polar frame in the manner described.

Various changes may be made in the mechanical details of construction without departing from the spirit and scope of my invention.

What I claim is:—

1. A frame for electric motors comprising a base having three bearings at one side and three corresponding bearings at the opposite side, a lower magnetic frame section rising from the base and carrying whole pole pieces below and between the two outer sets of bearings, and an upper magnetic frame section supported upon the lower section and provided with whole pole pieces above and between the two outer sets of bearings, each frame section having a half pole piece at each end and two half pole pieces between the whole pole pieces and in alinement with the intermediate set of bearings, the intermediate pole pieces being cored out to receive a shaft, substantially as described.

2. An electric motor comprising a base having three bearings at one side and three corresponding bearings at the opposite side, a lower magnetic frame section rising from the base and carrying whole pole pieces below and between the two outer sets of bearings, an upper magnetic frame section supported upon the lower section and provided with whole pole pieces above and between the two outer sets of bearings, each frame section having a half pole piece at each end and two half pole pieces between the whole pole pieces and in alinement with the intermediate set of bearings, the intermediate pole pieces being cored out to receive a shaft, an armature located between each set of whole pole pieces and having its shaft journaled in the adjacent bearings, a power shaft received in the cored out pole pieces, and journaled in the intermediate set of bearings, and meshed gears connecting the shafts, substantially as described.

3. An electric motor, having a magnet frame parted horizontally in two sections at the neutral line and carrying each two integral full pole-pieces, an integral vertical yoke member carried by each section centrally between its two full pole-pieces, the yoke member of each section carrying a half-pole piece at each side portion of its free end, and each section also having an integral half-pole piece at each side, opposite the half-pole piece on the yoke member, said yoke member having a shaft opening therethrough between the two half-pole pieces, substantially as described.

In testimony whereof, I have hereunto set my hand.

GEORGE W. RICHARDSON.

Witnesses:
JOSEPH K. ROSE, Jr.,
HARRY K. AMBLER.